United States Patent
Khoroshevsky et al.

(10) Patent No.: US 11,023,570 B2
(45) Date of Patent: Jun. 1, 2021

(54) USER AUTHENTICATION WITH ACOUSTIC FINGERPRINTING

(71) Applicant: EMC IP Holding Company LLC, Hopkinton, MA (US)

(72) Inventors: Stas Khoroshevsky, Rehovot (IL); Christina Tkachenko, Tel Aviv (IL); Chen Gantz, Hadera (IL); Julia Petukhov, Rishon-Lezzion (IL); Rei Maoz, Tel Aviv (IL); Liat Ben-Porat, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 143 days.

(21) Appl. No.: 16/259,446

(22) Filed: Jan. 28, 2019

(65) Prior Publication Data

US 2020/0242224 A1 Jul. 30, 2020

(51) Int. Cl.

| | | |
|---|---|---|
| *G06F 21/30* | (2013.01) | |
| *G06F 21/31* | (2013.01) | |
| *A61B 5/00* | (2006.01) | |
| *H04B 11/00* | (2006.01) | |
| *G06F 21/32* | (2013.01) | |

(Continued)

(52) U.S. Cl.
CPC .......... *G06F 21/32* (2013.01); *G06F 9/30003* (2013.01); *G06K 9/0002* (2013.01); *G06K 9/00087* (2013.01)

(58) Field of Classification Search
USPC .......... 382/115–128, 155–253; 704/200–278
See application file for complete search history.

(56) References Cited

U.S. PATENT DOCUMENTS

| | | | | |
|---|---|---|---|---|
| 7,334,735 | B1* | 2/2008 | Antebi | G01S 5/22 235/492 |
| 9,264,151 | B1* | 2/2016 | Emigh | H04W 4/23 |
| 9,478,063 | B2* | 10/2016 | Rhoads | G06F 16/5866 |

(Continued)

OTHER PUBLICATIONS

Cooley et al., "An algorithm for the machine calculation of complex Fourier series". Mathematics of Computation. 19(90): 297-301, 1965.

(Continued)

*Primary Examiner* — Marcellus J Augustin
(74) *Attorney, Agent, or Firm* — Ryan, Mason & Lewis, LLP

(57) ABSTRACT

Methods, apparatus, and processor-readable storage media for user authentication with acoustic fingerprinting are provided herein. An example computer-implemented method includes generating, in response to an authentication request from a given device, an instruction for an acoustic output to be emitted and recorded by the given device; obtaining the recorded acoustic output from the given device; creating an acoustic fingerprint by applying one or more signal processing algorithms to the recorded acoustic output; processing the acoustic fingerprint and one or more items of information pertaining to the given device against historical authentication data; and resolving the authentication request in response to a determination that the acoustic fingerprint and the one or more items of information pertaining to the given device match at least a portion of the historical authentication data.

20 Claims, 9 Drawing Sheets

(51) Int. Cl.
*G06F 9/30* (2018.01)
*G06K 9/00* (2006.01)

(56) References Cited

U.S. PATENT DOCUMENTS

| | | | |
|---|---|---|---|
| 9,898,723 B2* | 2/2018 | Rutherford | G06Q 20/40145 |
| 10,042,038 B1* | 8/2018 | Lord | G10L 25/51 |
| 10,692,490 B2* | 6/2020 | Lesso | G10L 15/22 |
| 10,853,032 B1* | 12/2020 | Dodge | G06F 3/167 |
| 2008/0256613 A1* | 10/2008 | Grover | G10L 15/26 |
| | | | 726/5 |
| 2016/0241074 A1 | 8/2016 | Hsu | |
| 2019/0013027 A1 | 1/2019 | Page et al. | |
| 2019/0149987 A1* | 5/2019 | Moore | G06F 3/167 |
| | | | 726/9 |
| 2019/0220581 A1* | 7/2019 | Li | G06F 21/32 |
| 2019/0362064 A1* | 11/2019 | Zhang | G06F 21/44 |

OTHER PUBLICATIONS

Das et al., "Do You Hear What I Hear?: Fingerprinting Smart Devices Through Embedded Acoustic Components", CCS '14 Proceedings of the ACM SIGSAC Conference on Computer and Communications Security, 441-452, 2014.

Zhou et al., "Acoustic Fingerprinting Revisited: Generate Stable Device ID Stealthily with Inaudible Sound", CCS '14 Proceedings of the 2014 ACM SIGSAC Conference on Computer and Communications Security, 429-440, 2014.

Karapanos et al., "Sound-Proof: Usable Two-Factor Authentication Based on Ambient Sound", SEC'15 Proceedings of the 24th USENIX Conference on Security Symposium, 483-498, 2015.

Wikipedia, Fourier transform, https://en.wikipedia.org/w/index.php?title=Fourier_transform&oldid=878697332, Jan. 16, 2019.

Chernekno, S., Fast Fourier transform—FFT, www.librow.com, Dec. 15, 2018.

Bojinov et al., "Mobile Device Identification via Sensor Fingerprinting", Aug. 2014.

* cited by examiner

FIG. 6        600

```python
def doFFT(filepath):

sampFreq, snd = wavfile.read(filepath)
    snd = snd / (2. ** 15)

s = (snd[:, 0] + snd[:, 1]) / 2   # avg n = len(s)
    p = np.fft.rfft(s)   # take the fourier transform nUniquePts = int(np.ceil((n + 1) / 2.0))
    p = p[0:nUniquePts]
    p = abs(p)

p = p / float(n)
    p = p ** 2 if n % 2 > 0:
        p[1:len(p)] = p[1:len(p)] * 2
    else:
        p[1:len(p) - 1] = p[1:len(p) - 1] * 2 freqArray = np.arange(0, nUniquePts, 1.0) * (sampFreq / n);

return [freqArray/1000, 10*np.log10(p)]

def analyze(f,P, xmin, xmax):
    ytemp = []

for i in range(len(f)):
        if f[i] >= xmin and f[i] <= xmax:
            ytemp.append(P[i])

return [np.min(ytemp),np.average(ytemp),np.max(ytemp)]

if __name__ == "__main__":
    filepath = sys.argv[1]
    f, P = doFFT(filepath)   # x - frequency[kHz], y = power[dB]
    [min, avg, max] = analyze(f, P, 14.5, 15.5)
    print('%f,%f,%f' % (min, avg, max))
```

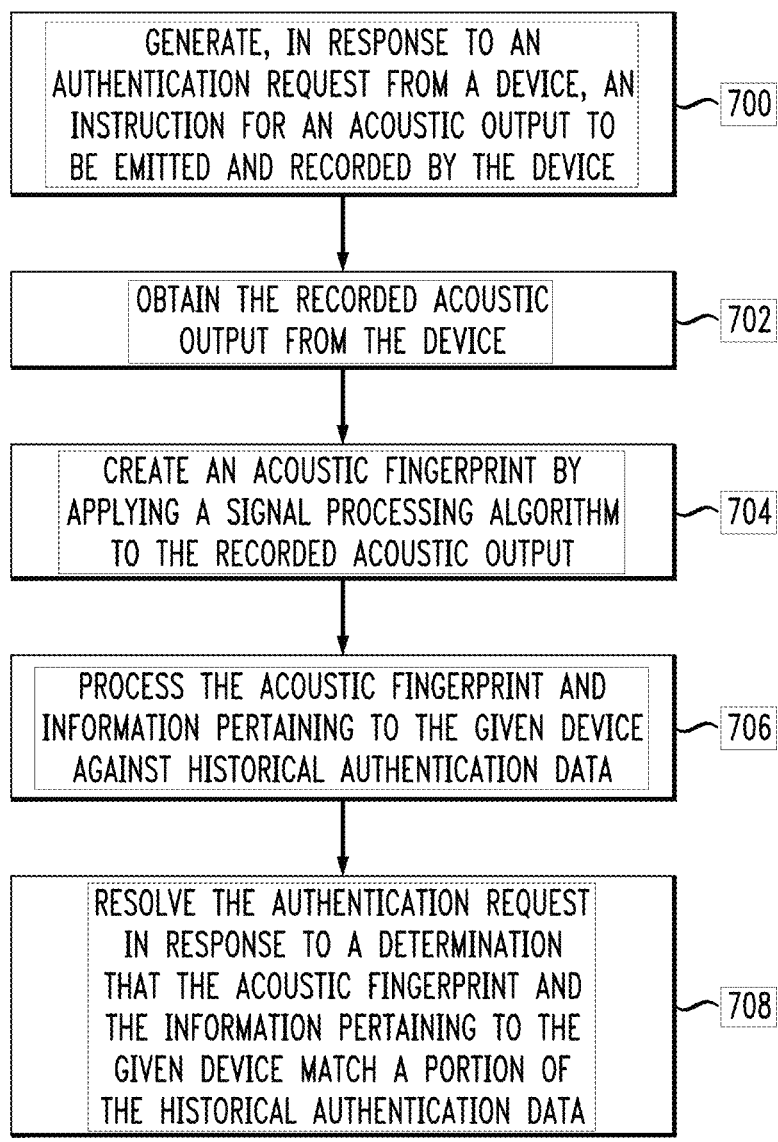

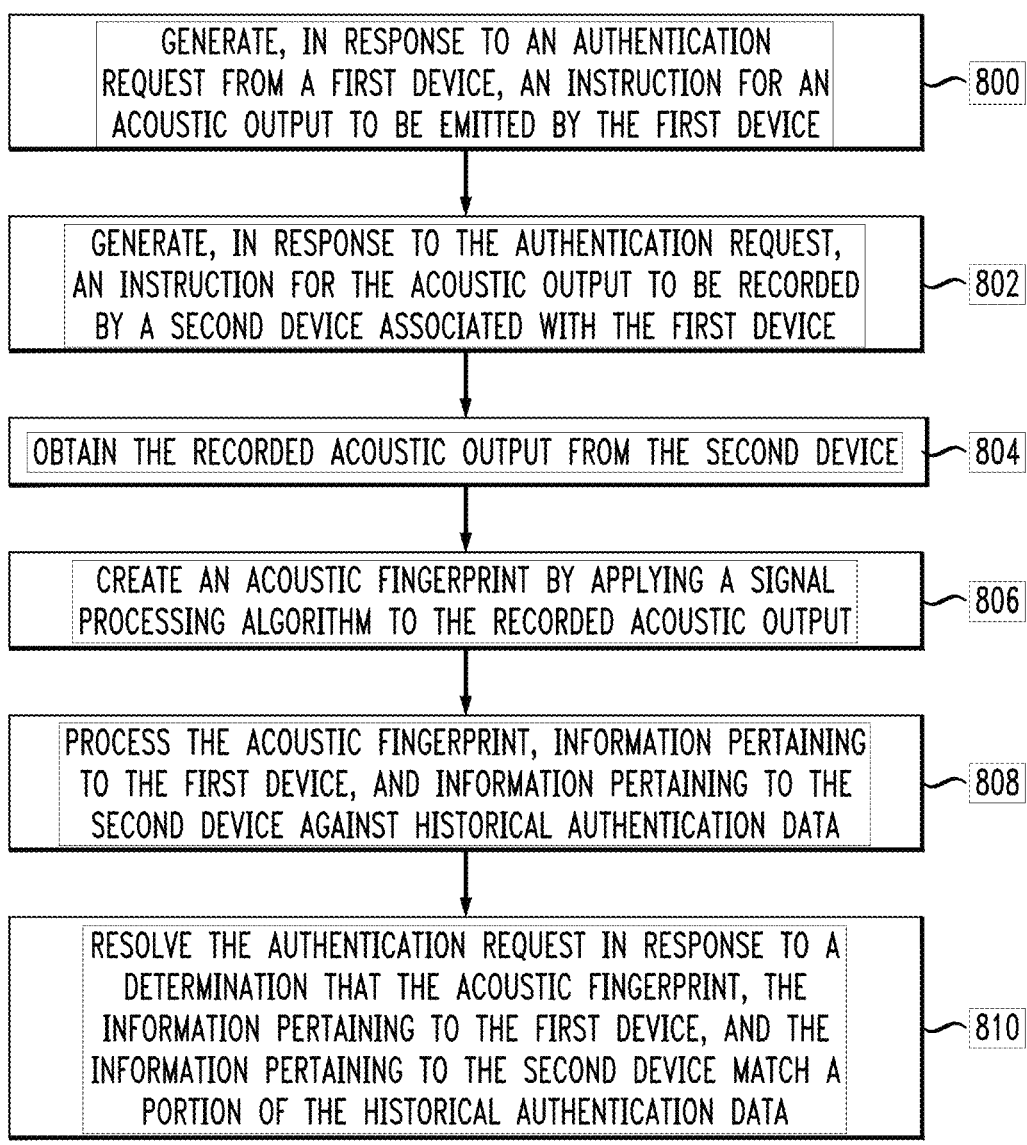

USER AUTHENTICATION WITH ACOUSTIC FINGERPRINTING

FIELD

The field relates generally to information processing systems, and more particularly to techniques for providing security in such systems.

BACKGROUND

In order to gain access to applications or other resources via a computer or another user device, users are often required to authenticate themselves by entering authentication information. Such authentication information may include, for example, passwords, responses to one or more challenge questions, or other forms of cryptographic or authentication information (including one-time passwords (OTPs), biometric mechanisms, etc.).

Additionally, a significant portion of electronic commerce and other sensitive online traffic originates from mobile devices. As part of the authentication process involving mobile devices, identifiers are often implemented. However, in conventional authentication techniques, many of the commonly-used identifiers are blocked by operating systems, easily manipulated, and/or require intrusive procedures for user implementation.

SUMMARY

Illustrative embodiments of the disclosure provide techniques for user authentication with acoustic fingerprinting. An exemplary computer-implemented method includes generating, in response to an authentication request from a given device, an instruction for an acoustic output to be emitted and recorded by the given device. Such a method also includes obtaining the recorded acoustic output from the given device, creating an acoustic fingerprint by applying one or more signal processing algorithms to the recorded acoustic output, and processing the acoustic fingerprint and one or more items of information pertaining to the given device against historical authentication data. Further, such a method includes resolving the authentication request in response to a determination that the acoustic fingerprint and the one or more items of information pertaining to the given device match at least a portion of the historical authentication data.

Another exemplary computer-implemented method includes generating, in response to an authentication request from a first device, an instruction for an acoustic output to be emitted by the first device, as well as generating, in response to the authentication request from the first device, an instruction for the acoustic output to be recorded by a second device associated with the first device. Such a method also includes obtaining the recorded acoustic output from the second device, creating an acoustic fingerprint by applying one or more signal processing algorithms to the recorded acoustic output, and processing the acoustic fingerprint, one or more items of information pertaining to the first device, and one or more items of information pertaining to the second device against historical authentication data. Further, such a method includes resolving the authentication request in response to a determination that the acoustic fingerprint, the one or more items of information pertaining to the first device, and the one or more items of information pertaining to the second device match at least a portion of the historical authentication data.

Illustrative embodiments can provide significant advantages relative to conventional authentication techniques. For example, challenges associated with identifiers that are blocked by operating systems, easily manipulated, and/or require intrusive procedures for user implementation are overcome through performing a reliable hardware fingerprinting of a speaker and a microphone of one or more user devices and confirming that the generated hardware fingerprint is associated with a known and previously authenticated device.

These and other illustrative embodiments described herein include, without limitation, methods, apparatus, systems, and computer program products comprising processor-readable storage media.

BRIEF DESCRIPTION OF THE DRAWINGS

FIG. 6 shows source code for the fast Fourier Transform (FFT) algorithm in an illustrative embodiment.

FIG. 7 is a flow diagram of a process for user authentication with acoustic fingerprinting in an illustrative embodiment.

FIG. 8 is a flow diagram of a process for user authentication with acoustic fingerprinting in an illustrative embodiment.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
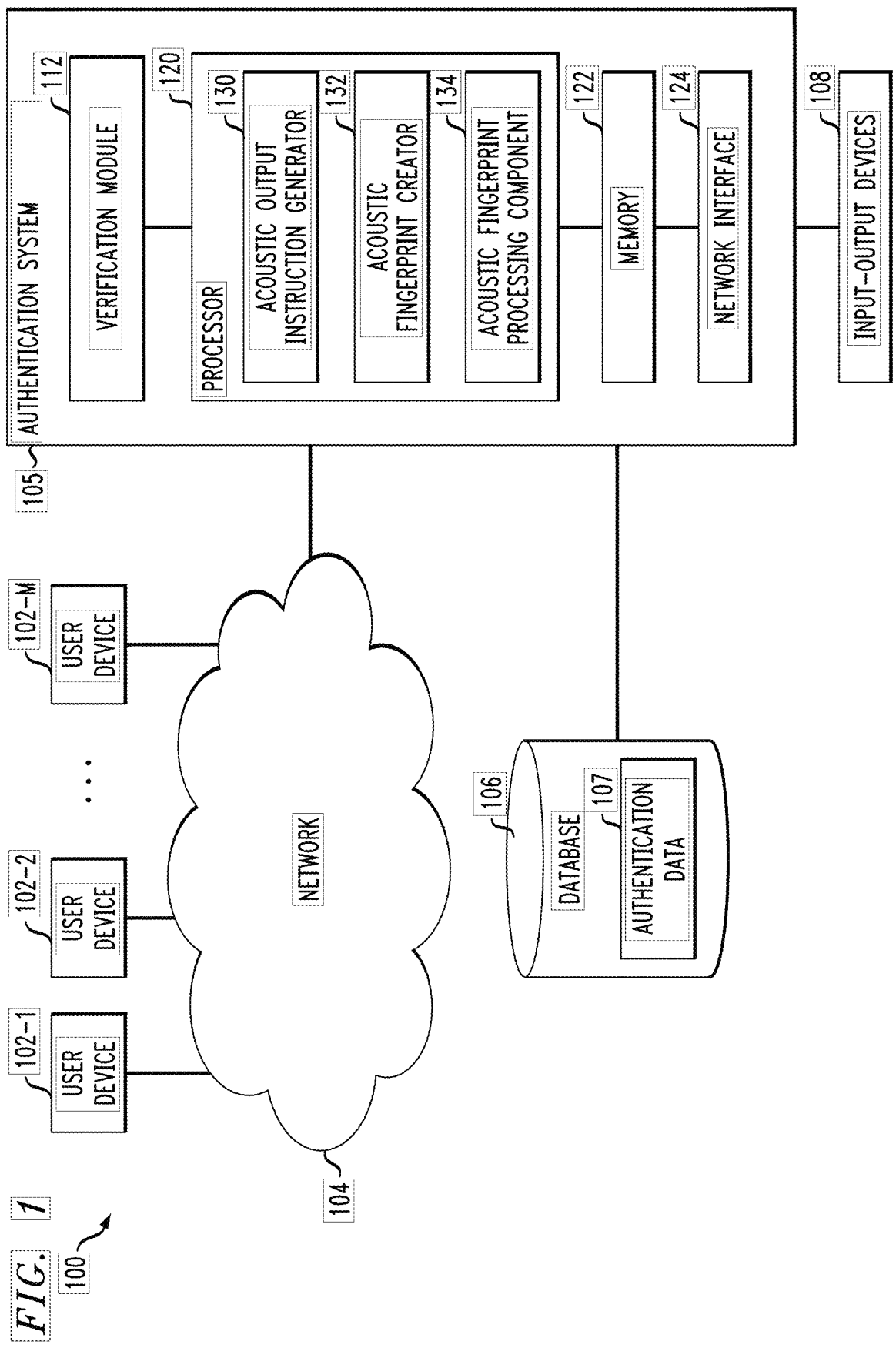
FIG. 1 shows an information processing system configured for user authentication with acoustic fingerprinting in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is authentication system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the authentication system 105 can have an associated database 106 configured to store data 107 pertaining to authentication information associated with authentication events, which comprise, for example, authentication data including acoustic fingerprints.

The database 106 in the present embodiment is implemented using one or more storage systems associated with the authentication system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the authentication system 105 are input-output devices 108, which illustratively comprise keyboards, displays or other types of input-output devices in any combination. Such input-output devices can be used, for example, to support one or more user interfaces to the authentication system 105, as well as to support communication between the authentication system 105 and other related systems and devices not explicitly shown.

Figure 2:
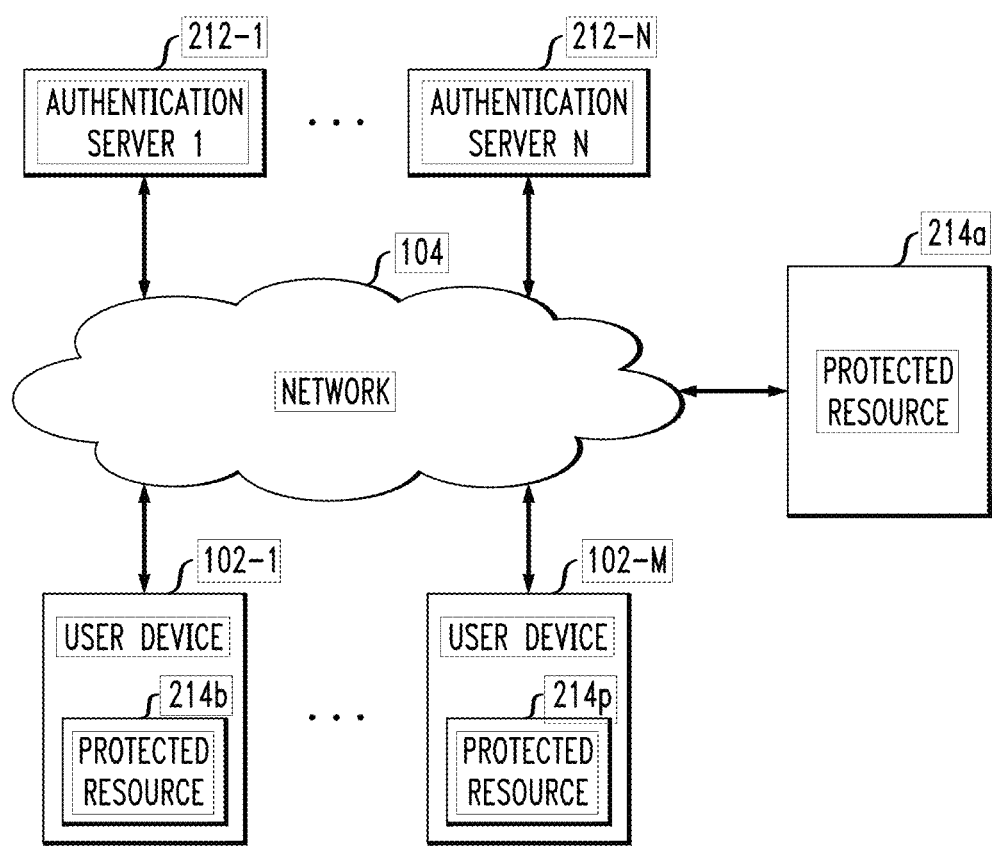
FIG. 2 shows another information processing system configured for user authentication with acoustic fingerprinting in an illustrative embodiment.

As also depicted in the example embodiment detailed in FIG. 1, authentication system 105 comprises a verification module 112. Login events initiated at respective ones of the user devices 102 are directed to the verification module 112 over the network 104 for processing. The verification module 112 determines if a given access attempt is authentic based on presentation of one or more predetermined authentication factors such as user identifiers, passwords or other factors (as further detailed herein). Upon verification of the presented authentication factors, the verification module 112 grants the requesting user device 102 access to one or more protected resources of the computer network 100. Although shown as an element of the authentication system 105 in this embodiment, the verification module 112 in other embodiments can be implemented at least in part externally to the authentication system 105, for example, as a stand-alone authentication server, set of servers or other type of authentication system coupled to the network 104 (such as depicted in FIG. 2 via authentication servers 212, for example).

The authentication system 105 in the FIG. 1 embodiment is assumed to be implemented using at least one processing device. Each such processing device generally comprises at least one processor and an associated memory, and implements one or more functional modules for controlling certain features of the authentication system 105.

More particularly, the authentication system 105 in this embodiment each can comprise a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the authentication system 105 to communicate over the network 104 with the user devices 102, and illustratively comprises one or more conventional transceivers.

The processor 120 further comprises an acoustic output instruction generator 130, an acoustic fingerprint creator 132, and an acoustic fingerprint processing component 134.

It is to be appreciated that this particular arrangement of modules 130, 132 and 134 illustrated in the processor 120 of the FIG. 1 embodiment is presented by way of example only, and alternative arrangements can be used in other embodiments. For example, the functionality associated with the modules 130, 132 and 134 in other embodiments can be combined into a single module, or separated across a larger number of modules. As another example, multiple distinct processors can be used to implement different ones of the modules 130, 132 and 134 or portions thereof.

At least portions of the acoustic output instruction generator 130, acoustic fingerprint creator 132, and acoustic fingerprint processing component 134 may be implemented at least in part in the form of software that is stored in memory 122 and executed by processor 120. Similarly, at least portions of the verification module 112 of authentication system 105 can be implemented at least in part in the form of software that is stored in memory 122 and executed by processor 120.

It is to be understood that the particular set of elements shown in FIG. 1 for user authentication with acoustic fingerprinting involving user devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing acoustic output instruction generator 130, acoustic fingerprint creator 132, and acoustic fingerprint processing component 134 of an example authentication system 105 in computer network 100 will be described in more detail with reference to the flow diagrams of FIG. 7 and FIG. 8.

FIG. 2 is a system diagram of an illustrative embodiment. By way of illustration, FIG. 2 depicts an alternative embodiment to FIG. 1, wherein the authentication server(s) 212 is/are not resident on the authentication system 105, but rather are separate devices. Accordingly, as depicted in FIG. 2, a user device 102 communicates with a protected resource 214*a* over network 104. As detailed further below, at least one embodiment can also include user devices 102-1 . . . 102-M that include protected resources 214*b* . . . 214*p* residing thereon. In an example implementation, a user authenticates online with one or more authentication servers 212-1 through 212-N (hereinafter, collectively referred to as authentication servers 212) before obtaining access to protected resource 214*a*, 214*b* and/or 214*p* (hereinafter, collectively referred to as protected resource 214 unless otherwise specified).

According to one aspect of the disclosure, as noted above, the user of a user device 102 is authenticated by authentication servers 212 using a password, challenge questions, and/or other forms of cryptographic information. The exemplary communications among the system elements 102, 104 and 214 of FIG. 2 to achieve authentication by the authentication servers 212 are discussed further below.

It is to be appreciated that a given embodiment of the disclosed system includes multiple instances of user device 102 and protected resource 214, and possibly other system components, although only single instances of such components are shown in the simplified system diagram of FIG. 2 for clarity of illustration.

As noted herein, user device 102 may represent a portable device, such as a mobile telephone, personal digital assistant (PDA), wireless email device, game console, etc. User device 102 may alternatively represent a desktop or laptop personal computer (PC), a microcomputer, a workstation, a mainframe computer, a wired telephone, a television set top box, or any other information processing device which can benefit from the use of authentication techniques in accordance with the invention.

User device 102 can also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password, challenge question, or other cryptographic information described as being associated with a user may, for example, be associated with a user device 102, a person utilizing or otherwise associated with the device, or a combination of both the person and the device.

As also depicted in FIG. 2, the authentication servers 212 can be associated with a third-party entity, such as an authentication authority, that processes authentication requests on behalf of web servers and other resources, as well as verifies the cryptographic information that is presented by a user device 102.

Further, the protected resource 214 may be, for example, an access-controlled application, web site or hardware device. In other words, a protected resource 214 is a resource that grants user access responsive to an authentication process, as will be described in greater detail below. For example, protected resource 214*a* can include an access-controlled file, e-mail, a protected application, a remote application server such as a web site or other software program or hardware device that is accessed by the user device 102 over a network 104.

Additionally, in at least one embodiment, protected resource 214*b* can include one or more applications or data residing on the user device 102 itself. For example, such a protected resource 214*b* can include access to a mobile data management container for launching applications on the user device 102 (such as a mobile device), which can be protected requiring authentication in order to run the application(s) protected by the container. Further, protected resource 214*b* could also include an access-controlled file, e-mail, a protected application, a remote application server such as a web site or other software program or hardware device that is accessed by the user device 102 over network 104. Similarly, it is possible that in order to unlock the mobile platform to perform operations, a successful authentication might be required.

Accordingly, at least one embodiment of the invention includes implementation of an authentication procedure which minimizes the user's friction while conducting the desired online activity (for example, login, e-commerce transaction, money transfer, etc.). Such an embodiment can be applied in a two-system scenario, wherein one system has an ability to emit sound via internal and/or external speakers and the other system has an ability to record the emitted sound via an internal and/or external microphone. Such an embodiment can be also applied to self-contained systems which have both of sound emitting and sound recording abilities (such as tablets, mobile phones etc.).

As detailed herein, the Fourier transform (FT) decomposes a function of time (a signal) into the frequencies that make it up, in a way similar, for example, to how a musical chord can be expressed as the frequencies (or pitches) of its constituent notes. The Fourier transform of a function of time itself is a complex-valued function of frequency, whose absolute value represents the amount of that frequency present in the original function, and whose complex argument is the phase offset of the basic sinusoid in that frequency. In one or more embodiments, the Fourier transform of a function $f$ f is denoted by $\hat{f}$ as follows: $\hat{f}(\xi) = \int_{-\infty}^{\infty} f(x) e^{-2\pi i x \xi} dx$, for any real number $\xi$.

When the independent variable x represents time, the transform variable $\xi$ represents frequency (e.g., if time is measured in seconds, then the frequency is in hertz). The Fourier transform is also referred to as the frequency domain representation of the original signal. Additionally, the Fourier transform is used for the spectral analysis of time-series, which allows for the conversion of the recorded signal into a frequency domain and for the analysis of the amplitude of the fast Fourier transform (FFT). The FFT refers to a way by which the discrete Fourier transform (DFT) can be calculated efficiently, using symmetries in the calculated terms.

In accordance with one or more embodiments, it is noted that different hardware devices create different frequency response curves. Such differences are utilized by one or more embodiments to generate unique and reliable identifiers of the hardware devices. By way merely of example, FIG. 3 through FIG. 5 illustrate various use cases involving e-commerce and/or electronic banking transactions in which the identification and/or authentication mechanism detailed in one or more embodiments can be applied.

Figure 3:
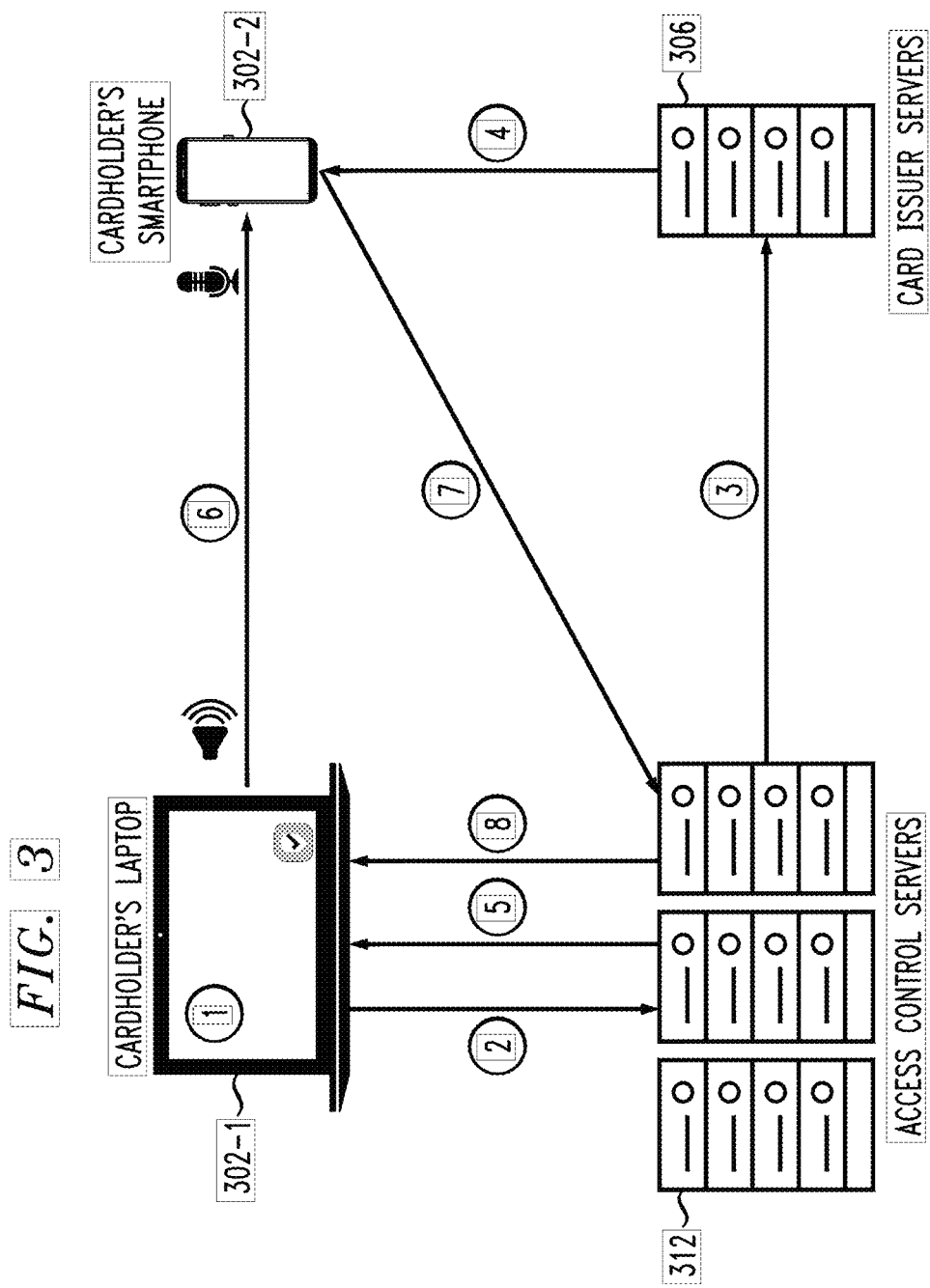
FIG. 3 shows browser session authentication in an illustrative embodiment.

FIG. 3 shows browser session authentication in an illustrative embodiment. In FIG. 3, step 1 shows a cardholder engaging, via the cardholder's laptop 302-1, in transaction activity which requires a step-up authentication. In step 2, the information pertaining to the transaction is collected by the access control servers 312. In step 3, the access control servers 312 initiate a connection with card issuer servers 306 via a dedicated application programming interface (API), and the card issuer (via servers 306) determines whether the cardholder has a card issuer application on his or her mobile device 302-2 (such as a smartphone). Once the application is located, step 4 includes the card issuer (via servers 306) engaging a microphone on the cardholder's mobile device 302-2 and commencing a recording function, while the access control servers 312 play an inaudible (high-frequency) sound on cardholder's laptop 302-1 in step 5.

Further, in step 6, the cardholder's mobile device (302-2) microphone records the inaudible sound, and in step 7, the cardholder's mobile device 302-2 sends the obtained recording/file to the access control servers 312 for processing. In step 8, the access control servers 312 analyze the obtained recording, and, if the recording matches previous cardholder data, authenticates the transaction.

Figure 4:
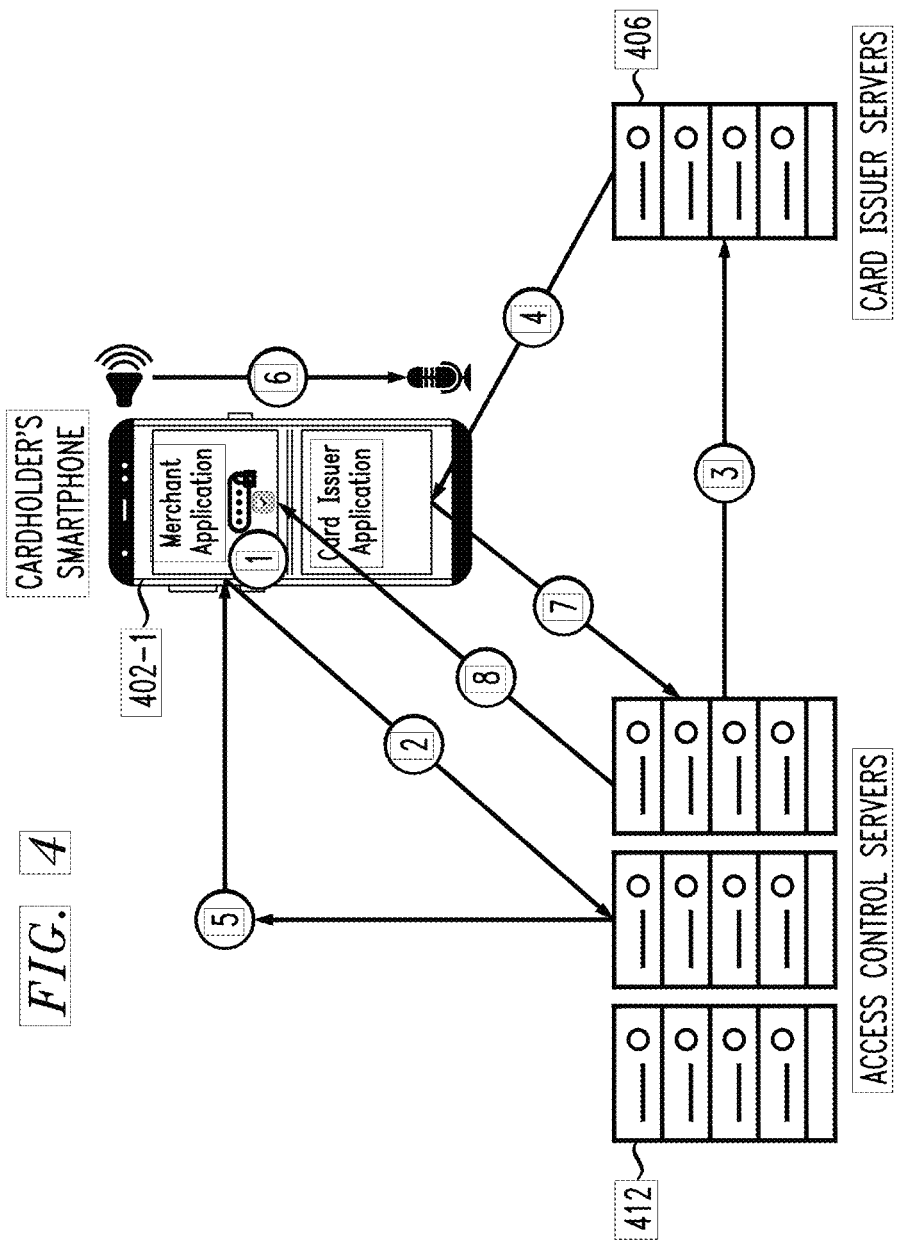
FIG. 4 shows mobile application authentication in an illustrative embodiment.
Figure 5:
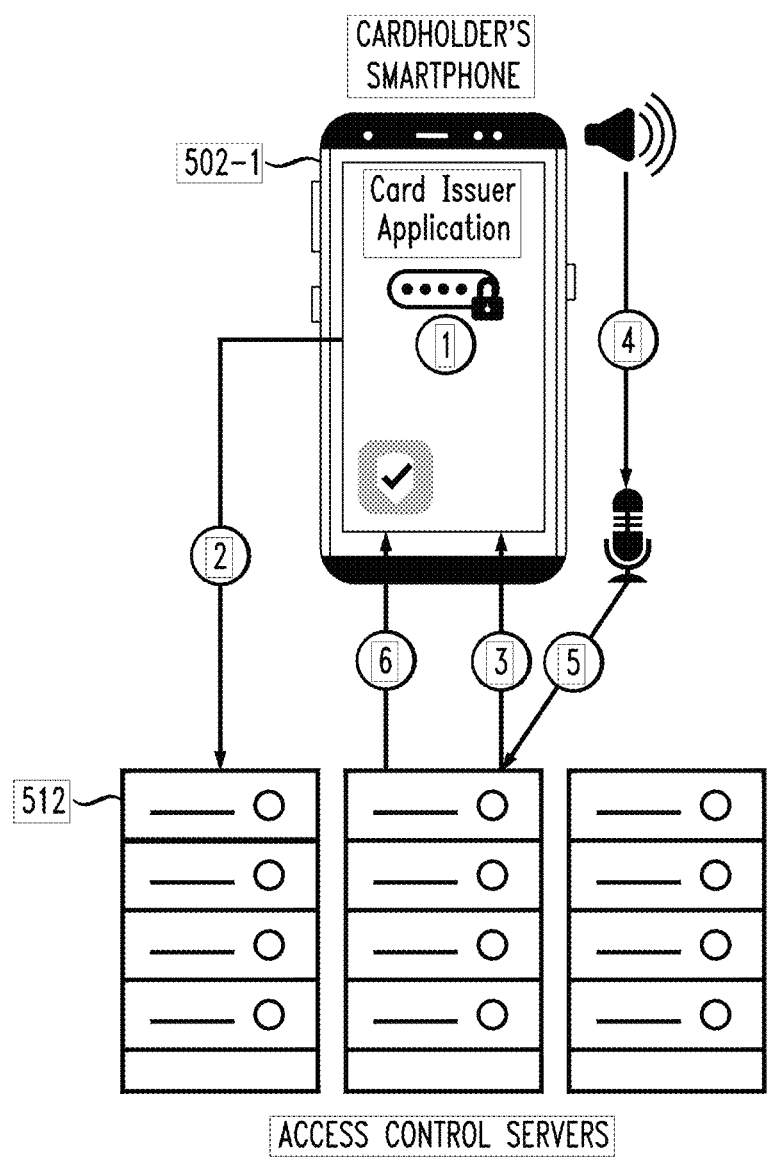
FIG. 5 shows device identification in mobile applications in an illustrative embodiment.

FIG. 4 shows mobile application authentication in an illustrative embodiment. In FIG. 4, step 1 shows a cardholder engaging, via the cardholder's smartphone 402-1, in transaction activity which requires a step-up authentication in a merchant's application. In step 2, the information pertaining to the transaction is collected by the access control servers 412. In step 3, the access control servers 412 initiate a connection with card issuer servers 406 via a dedicated API, and the card issuer (via servers 406) determines whether the cardholder has a card issuer application on his or her smartphone 402-1. Once the application is located, step 4 includes the card issuer (via servers 406) engaging a microphone on the cardholder's smartphone 402-1 and commencing a recording function, while the access control servers 412 play an inaudible (high-frequency) sound on the cardholder's smartphone 402-1 in step 5.

Further, in step 6, the cardholder's smartphone (402-1) microphone records the inaudible sound, and in step 7, the cardholder's smartphone 402-1 sends the obtained recording/file to the access control servers 412 for processing. In step 8, the access control servers 412 analyze the obtained recording, and, if the recording matches previous cardholder data, authenticates the transaction.

FIG. 5 shows device identification in mobile applications in an illustrative embodiment. In connection with the FIG. 5 example embodiment, assume a mobile device (i.e., cardholder's smartphone 502-1) in which both sound emission and sound recording can be performed. Also assume that an online banking application of a digital bank is installed on cardholder's smartphone 502-1, and login activity is attempted (via the application) by the user to access his digital bank account.

Accordingly, in FIG. 5, step 1 includes the cardholder/user engaging, via opening the application on cardholder's smartphone 502-1 and attempting to log-in, in transaction activity which requires a step-up authentication. In step 2, the information pertaining to the transaction is collected by the access control servers 512 associated with the online banking application. In step 3, the access control servers 512 engage a microphone on the cardholder's smartphone 502-1 and commence a recording function, and in step 4, the access control servers 512 play an inaudible (high-frequency) sound on the cardholder's smartphone 502-1 (which is recorded by the microphone of the cardholder's smartphone 502-1). In step 5, the cardholder's smartphone 502-1 sends the recording to the access control servers 512 for processing. In step 6, the access control servers 512 analyze the obtained recording, and, if the recording matches previous cardholder data, authenticates the transaction.

As such, in at least one embodiment of the invention, if the analyzed recording matches recording data of a known device from the user's history, the access is granted; otherwise, OTP step-up authentication (and/or some other form of authentication) is conducted. Additionally, in at least one embodiment, the sound emitted as part of the authentication process detailed herein includes one or more frequencies inaudible to the human ear (that is, frequencies below approximately twenty hertz and/or or frequencies above approximately twenty kilohertz). The recorded sound, as detailed above, is then sent to authentication servers (such as access control servers) for analysis. Such analysis, in one or more embodiments, includes utilizing an FFT algorithm to convert the recording into a frequency response domain. Further, as noted above, if the converted output matches a regular pattern observed for the user on previous attempts, the device is identified as known and the access is granted.

FIG. 6 shows source code for and implementation of an FFT algorithm in an illustrative embodiment. In this embodiment, pseudocode 600 is executed by or under the control of a system, such as authentication system 105, or another type of processing system.

The pseudocode 600 illustrates how the noted FFT algorithm can be implemented by analyzing an input audio file and creating a Fourier Transform of the audio signal, which can be used to generate insights such as, e.g., minimum/maximum values and an average value of the frequency peaks.

It is to be appreciated that this particular pseudocode shows just one example implementation of creating a signature curve/graph from a sound file, and alternative implementations of the process can be used in other embodiments.

FIG. 7 is a flow diagram of a process for user authentication with acoustic fingerprinting in an illustrative embodiment. It is to be understood that this particular process is only an example, and additional or alternative processes can be carried out in other embodiments.

In this embodiment, the process includes steps 700 through 708.

Step 700 includes generating, in response to an authentication request from a given device, an instruction for an acoustic output to be emitted and recorded by the given device. The instruction can include an instruction to engage a microphone of the given device to emit the acoustic output and to engage at least one speaker of the given device to record the acoustic output. Additionally, the given device can include a mobile device, and the acoustic output can include, for example, one or more acoustic frequencies below approximately twenty hertz or one or more acoustic frequencies above approximately twenty kilohertz.

Step 702 includes obtaining the recorded acoustic output from the given device. Step 704 includes creating an acoustic fingerprint by applying one or more signal processing algorithms to the recorded acoustic output. The one or more signal processing algorithms can include one or more fast Fourier transform algorithms.

Step 706 includes processing the acoustic fingerprint and one or more items of information pertaining to the given device against historical authentication data. Step 708 includes resolving the authentication request in response to a determination that the acoustic fingerprint and the one or more items of information pertaining to the given device match at least a portion of the historical authentication data.

FIG. 8 is a flow diagram of a process for user authentication with acoustic fingerprinting in an illustrative embodiment. It is to be understood that this particular process is only an example, and additional or alternative processes can be carried out in other embodiments.

In this embodiment, the process includes steps 800 through 810.

Step 800 includes generating, in response to an authentication request from a first device, an instruction for an acoustic output to be emitted by the first device. The instruction can include an instruction to engage a microphone of the first device to emit the acoustic output. Additionally, the acoustic output can include, for example, one or more acoustic frequencies below approximately twenty hertz or one or more acoustic frequencies above approximately twenty kilohertz.

Step 802 includes generating, in response to the authentication request from the first device, an instruction for the acoustic output to be recorded by a second device associated with the first device. The instruction can include an instruction to engage least one speaker of the second device to record the acoustic output. Step 804 includes obtaining the recorded acoustic output from the second device.

Step 806 includes creating an acoustic fingerprint by applying one or more signal processing algorithms to the recorded acoustic output. The one or more signal processing algorithms can include one or more fast Fourier transform algorithms. Step 808 includes processing the acoustic fingerprint, one or more items of information pertaining to the first device, and one or more items of information pertaining to the second device against historical authentication data. At least one of the first device and the second device can include a mobile a device.

Step 810 includes resolving the authentication request in response to a determination that the acoustic fingerprint, the one or more items of information pertaining to the first device, and the one or more items of information pertaining to the second device match at least a portion of the historical authentication data.

Accordingly, the particular processing operations and other functionality described in conjunction with the flow diagrams of FIG. 7 and FIG. 8 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to implement acoustic fingerprinting to facilitate correct identification of a user's device. These and other embodiments can effectively allow for a largely frictionless experience for genuine users as well as improved protection against fraudulent attacks.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of one or more of a computer system and an authentication system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
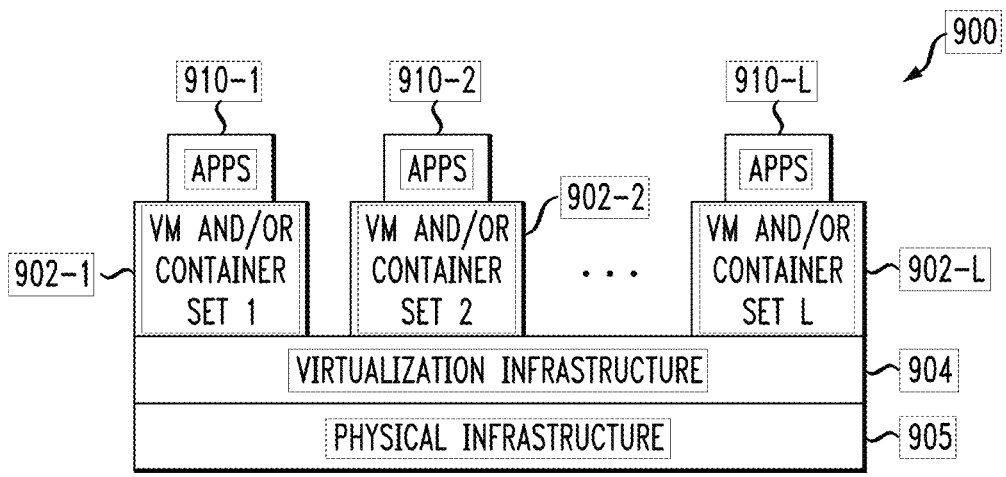
FIGS. 9 and 10 show examples of processing platforms that may be utilized to implement at least a portion of an information processing system in illustrative embodiments.
Figure 10:
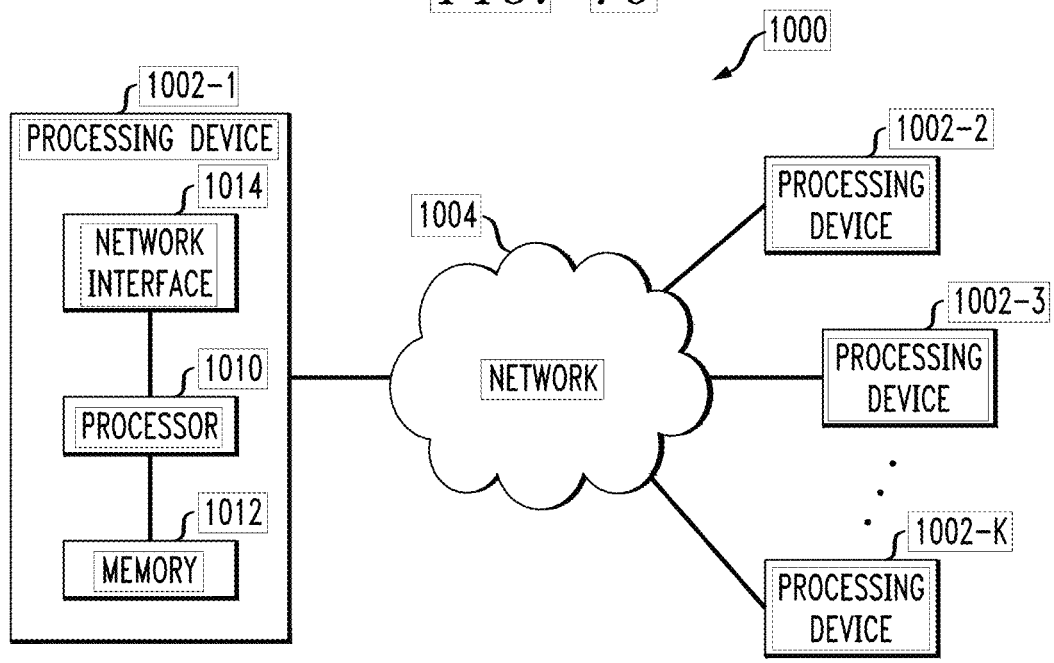

FIG. 9 shows an example processing platform comprising cloud infrastructure 900. The cloud infrastructure 900 comprises a combination of physical and virtual processing resources that are utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 comprise respective VMs, respective sets of one or more containers, or respective sets of one or more containers running in VMs. In some implementations of the FIG. 9 embodiment, the VMs/container sets 902 comprise respective VMs implemented using virtualization infrastructure 904 that comprises at least one hypervisor.

An example of a hypervisor platform used to implement a hypervisor within the virtualization infrastructure 904 is the VMware® vSphere® which has an associated virtual infrastructure management system such as the VMware® vCenter™. The underlying physical machines comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1002-1 in the processing platform 1000 comprises a processor 1010 coupled to a memory 1012.

The processor 1010 comprises a microprocessor, a microcontroller, an application-specific integrated circuit (ASIC), a field-programmable gate array (FPGA) or other type of processing circuitry, as well as portions or combinations of such circuitry elements.

The memory 1012 comprises random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing platforms, modules, cloud-based systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
generating, in response to an authentication request from a given device, an instruction for an acoustic output to be emitted and recorded by the given device, wherein the acoustic output comprises one or more frequencies below approximately twenty hertz;
obtaining the recorded acoustic output from the given device;
creating an acoustic fingerprint by converting the recorded acoustic output into at least one frequency response curve using one or more fast Fourier transform algorithms, and attributing the at least one frequency response curve to the given device;
processing the acoustic fingerprint and one or more items of information pertaining to the given device against historical authentication data; and
resolving the authentication request in response to a determination that the acoustic fingerprint and the one or more items of information pertaining to the given device match at least a portion of the historical authentication data;
wherein the method is performed by at least one processing device comprising a processor coupled to a memory.

2. The computer-implemented method of claim 1, wherein the instruction for the acoustic output to be emitted and recorded by the given device comprises an instruction to engage a microphone of the given device to emit the acoustic output and to engage at least one speaker of the given device to record the acoustic output.

3. The computer-implemented method of claim 1, wherein the given device comprises a mobile device.

4. The computer-implemented method of claim 1, wherein the acoustic output comprises one or more acoustic frequencies above approximately twenty kilohertz.

5. A non-transitory processor-readable storage medium having stored therein program code of one or more software programs, wherein the program code when executed by at least one processing device causes the at least one processing device to carry out the steps of the method of claim 1.

6. An apparatus comprising:
at least one processing device comprising a processor coupled to a memory;
the at least one processing device being configured:
to generate, in response to an authentication request from a given device, an instruction for an acoustic output to be emitted and recorded by the given device, wherein the acoustic output comprises one or more frequencies below approximately twenty hertz;
to obtain the recorded acoustic output from the given device;
to create an acoustic fingerprint by converting the recorded acoustic output into at least one frequency response curve using one or more fast Fourier transform algorithms, and attributing the at least one frequency response curve to the given device;
to process the acoustic fingerprint and one or more items of information pertaining to the given device against historical authentication data; and
to resolve the authentication request in response to a determination that the acoustic fingerprint and the one or more items of information pertaining to the given device match at least a portion of the historical authentication data.

7. The apparatus of claim 6, wherein the instruction for the acoustic output to be emitted and recorded by the given device comprises an instruction to engage a microphone of the given device to emit the acoustic output and to engage at least one speaker of the given device to record the acoustic output.

8. The apparatus of claim 6, wherein the given device comprises a mobile device.

9. The apparatus of claim 6, wherein the acoustic output comprises one or more acoustic frequencies above approximately twenty kilohertz.

10. A computer-implemented method comprising:
generating, in response to an authentication request from a first device, an instruction for an acoustic output to be emitted by the first device, wherein the acoustic output comprises one or more frequencies below approximately twenty hertz;
generating, in response to the authentication request from the first device, an instruction for the acoustic output to be recorded by a second device associated with the first device;
obtaining the recorded acoustic output from the second device;
creating an acoustic fingerprint by converting the recorded acoustic output into at least one frequency response curve using one or more fast Fourier transform algorithms, and attributing the at least one frequency response curve to the given device;
processing the acoustic fingerprint, one or more items of information pertaining to the first device, and one or more items of information pertaining to the second device against historical authentication data; and
resolving the authentication request in response to a determination that the acoustic fingerprint, the one or more items of information pertaining to the first device, and the one or more items of information pertaining to the second device match at least a portion of the historical authentication data;
wherein the method is performed by at least one processing device comprising a processor coupled to a memory.

11. The computer-implemented method of claim 10, wherein the instruction for the acoustic output to be emitted by the first device comprises an instruction to engage a microphone of the first device to emit the acoustic output.

12. The computer-implemented method of claim 10, wherein the acoustic output comprises one or more acoustic frequencies above approximately twenty kilohertz.

13. The computer-implemented method of claim 10, wherein the instruction for the acoustic output to be recorded by the second device comprises an instruction to engage least one speaker of the second device to record the acoustic output.

14. The computer-implemented method of claim 10, wherein at least one of the first device and the second device comprises a mobile a device.

15. A non-transitory processor-readable storage medium having stored therein program code of one or more software programs, wherein the program code when executed by at least one processing device causes the at least one processing device to carry out the steps of the method of claim 10.

16. An apparatus comprising:
  at least one processing device comprising a processor coupled to a memory;
  the at least one processing device being configured:
    to generate, in response to an authentication request from a first device, an instruction for an acoustic output to be emitted by the first device, wherein the acoustic output comprises one or more frequencies below approximately twenty hertz;
    to generate, in response to the authentication request from the first device, an instruction for the acoustic output to be recorded by a second device associated with the first device;
    to obtain the recorded acoustic output from the second device;
    to create an acoustic fingerprint by converting the recorded acoustic output into at least one frequency response curve using one or more fast Fourier transform algorithms, and attributing the at least one frequency response curve to the given device;
    to process the acoustic fingerprint, one or more items of information pertaining to the first device, and one or more items of information pertaining to the second device against historical authentication data; and
    to resolve the authentication request in response to a determination that the acoustic fingerprint, the one or more items of information pertaining to the first device, and the one or more items of information pertaining to the second device match at least a portion of the historical authentication data.

17. The apparatus of claim 16, wherein the instruction for the acoustic output to be emitted by the first device comprises an instruction to engage a microphone of the first device to emit the acoustic output.

18. The apparatus of claim 16, wherein the acoustic output comprises one or more acoustic frequencies above approximately twenty kilohertz.

19. The apparatus of claim 16, wherein the instruction for the acoustic output to be recorded by the second device comprises an instruction to engage least one speaker of the second device to record the acoustic output.

20. The apparatus of claim 16, wherein at least one of the first device and the second device comprises a mobile a device.

\* \* \* \* \*